(12) United States Patent
Allard et al.

(10) Patent No.: US 11,994,337 B2
(45) Date of Patent: May 28, 2024

(54) VACUUM INSULATION STRUCTURES WITH MULTIPLE INSULATORS

(71) Applicant: WHIRLPOOL CORPORATION, Benton Harbor, MI (US)

(72) Inventors: Paul B. Allard, Coloma, MI (US); Abhay Naik, Stevensville, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 0 days.

(21) Appl. No.: 18/087,266

(22) Filed: Dec. 22, 2022

(65) Prior Publication Data

US 2023/0137842 A1 May 4, 2023

Related U.S. Application Data

(60) Division of application No. 17/037,855, filed on Sep. 30, 2020, now Pat. No. 11,555,643, which is a continuation of application No. 15/776,276, filed as application No. PCT/US2016/063966 on Nov. 29, 2016, now Pat. No. 10,808,987.

(60) Provisional application No. 62/265,055, filed on Dec. 9, 2015.

(51) Int. Cl.
| | | |
|---|---|---|
| *B29C 45/14* | (2006.01) | |
| *B29C 45/00* | (2006.01) | |
| *F25D 23/06* | (2006.01) | |

(52) U.S. Cl.
CPC .......... *F25D 23/062* (2013.01); *B29C 45/006* (2013.01); *F25D 23/066* (2013.01); *B23P 2700/12* (2013.01); *B29C 45/14* (2013.01); *F25D 2201/14* (2013.01); *Y10T 29/49359* (2015.01)

(58) Field of Classification Search
CPC .......... B23P 2700/12; Y10T 29/49359; F25D 23/062; F25D 23/066; F25D 2201/14; B29C 44/065
See application file for complete search history.

(56) References Cited

U.S. PATENT DOCUMENTS

| | | |
|---|---|---|
| 1,849,369 A | 3/1932 | Frost |
| 1,921,576 A | 8/1933 | Muffly |
| 2,191,659 A | 2/1940 | Hintze |
| 2,432,042 A | 12/1947 | Richard |

(Continued)

FOREIGN PATENT DOCUMENTS

| | | |
|---|---|---|
| CA | 626838 A | 5/1961 |
| CN | 201748744 U | 2/2011 |

(Continued)

OTHER PUBLICATIONS

Cai et al., "Generation of Metal Nanoparticles By Laser Ablation of Microspheres," J. Aerosol Sci., vol. 29, No. 5/6 (1998), pp. 627-636.

(Continued)

*Primary Examiner* — Jermie E Cozart
(74) *Attorney, Agent, or Firm* — Price Heneveld LLP

(57) ABSTRACT

A method for manufacturing a vacuum insulated structure includes positioning an inner liner within an external wrapper and defining a gap between the inner liner and the external wrapper, drawing a vacuum to seal the gap, and injecting a first insulator into the gap. The method further includes positioning a filter proximate to the first insulator within the gap and injecting a second insulator into the gap proximate to the filter.

15 Claims, 6 Drawing Sheets

(56) References Cited

U.S. PATENT DOCUMENTS

| | | |
|---|---|---|
| 2,451,884 A | 10/1948 | Stelzer |
| 2,729,863 A | 1/1956 | Kurtz |
| 3,290,893 A | 12/1966 | Haldopoulos |
| 3,338,451 A | 8/1967 | Kesling |
| 3,353,301 A | 11/1967 | Heilweil et al. |
| 3,353,321 A | 11/1967 | Heilweil et al. |
| 3,408,316 A | 10/1968 | Mueller et al. |
| 3,597,850 A | 8/1971 | Jenkins |
| 3,607,169 A | 9/1971 | Coxe |
| 3,632,012 A | 1/1972 | Kitson |
| 3,633,783 A | 1/1972 | Aue |
| 3,634,971 A | 1/1972 | Kesling |
| 3,670,521 A | 6/1972 | Dodge, III et al. |
| 3,769,770 A | 11/1973 | Deschamps et al. |
| 3,862,880 A | 1/1975 | Feldman |
| 3,868,829 A | 3/1975 | Mann et al. |
| 3,875,683 A | 4/1975 | Waters |
| 3,910,658 A | 10/1975 | Lindenschmidt |
| 3,933,398 A | 1/1976 | Haag |
| 3,935,787 A | 2/1976 | Fisher |
| 4,005,919 A | 2/1977 | Hoge et al. |
| 4,170,391 A | 10/1979 | Bottger |
| 4,242,241 A | 12/1980 | Rosen et al. |
| 4,260,876 A | 4/1981 | Hochheiser |
| 4,303,730 A | 12/1981 | Torobin |
| 4,303,732 A | 12/1981 | Torobin |
| 4,330,310 A | 5/1982 | Tate, Jr. et al. |
| 4,396,362 A | 8/1983 | Thompson et al. |
| 4,529,368 A | 7/1985 | Makansi |
| 4,583,796 A | 4/1986 | Nakajima et al. |
| 4,681,788 A | 7/1987 | Barito et al. |
| 4,781,968 A | 11/1988 | Kellerman |
| 4,865,875 A | 9/1989 | Kellerman |
| 4,870,735 A | 10/1989 | Jahr et al. |
| 4,914,341 A | 4/1990 | Weaver et al. |
| 5,066,437 A | 11/1991 | Barito et al. |
| 5,084,320 A | 1/1992 | Barito et al. |
| 5,094,899 A | 3/1992 | Rusek, Jr. |
| 5,121,593 A | 6/1992 | Forslund |
| 5,168,674 A | 12/1992 | Molthen |
| 5,171,346 A | 12/1992 | Hallett |
| 5,227,245 A | 7/1993 | Brands et al. |
| 5,251,455 A | 10/1993 | Cur et al. |
| 5,361,598 A | 11/1994 | Roseen |
| 5,375,428 A | 12/1994 | LeClear et al. |
| 5,500,287 A | 3/1996 | Henderson |
| 5,500,305 A | 3/1996 | Bridges et al. |
| 5,505,810 A | 4/1996 | Kirby et al. |
| 5,509,248 A | 4/1996 | Dellby et al. |
| 5,532,034 A | 7/1996 | Kirby et al. |
| 5,533,311 A | 7/1996 | Tirrell et al. |
| 5,599,081 A | 2/1997 | Revlett et al. |
| 5,600,966 A | 2/1997 | Valence et al. |
| 5,768,837 A | 6/1998 | Sjoholm |
| 5,792,801 A | 8/1998 | Tsuda et al. |
| 5,826,780 A | 10/1998 | Nesser et al. |
| 5,834,126 A | 11/1998 | Sheu |
| 5,918,478 A | 7/1999 | Bostic et al. |
| 5,950,395 A | 9/1999 | Takemasa et al. |
| 5,952,404 A | 9/1999 | Simpson et al. |
| 6,013,700 A | 1/2000 | Asano et al. |
| 6,063,471 A | 5/2000 | Dietrich et al. |
| 6,163,976 A | 12/2000 | Tada et al. |
| 6,164,739 A | 12/2000 | Schultz et al. |
| 6,187,256 B1 | 2/2001 | Aslan et al. |
| 6,209,342 B1 | 4/2001 | Banicevic et al. |
| 6,210,625 B1 | 4/2001 | Matsushita et al. |
| 6,244,458 B1 | 6/2001 | Frysinger et al. |
| 6,266,970 B1 | 7/2001 | Nam et al. |
| 6,294,595 B1 | 9/2001 | Tyagi et al. |
| 6,485,122 B2 | 1/2002 | Wolf et al. |
| 6,428,130 B1 | 8/2002 | Banicevic et al. |
| 6,430,780 B1 | 8/2002 | Kim et al. |
| 6,629,429 B1 | 10/2003 | Kawamura et al. |
| 6,655,766 B2 | 12/2003 | Hodges |
| 6,689,840 B1 | 2/2004 | Eustace et al. |
| 6,736,472 B2 | 5/2004 | Banicevic |
| 6,860,082 B1 | 3/2005 | Yamamoto et al. |
| 7,008,032 B2 | 3/2006 | Chekal et al. |
| 7,197,792 B2 | 4/2007 | Moon |
| 7,197,888 B2 | 4/2007 | LeClear et al. |
| 7,207,181 B2 | 4/2007 | Murray et al. |
| 7,234,247 B2 | 6/2007 | Maguire |
| 7,263,744 B2 | 9/2007 | Kim et al. |
| 7,360,371 B2 | 4/2008 | Feinauer et al. |
| 7,475,562 B2 | 1/2009 | Jackovin |
| 7,517,031 B2 | 4/2009 | Laible |
| 7,614,244 B2 | 11/2009 | Venkatakrishnan et al. |
| 7,665,326 B2 | 2/2010 | LeClear et al. |
| 7,703,217 B2 | 4/2010 | Tada et al. |
| 7,703,824 B2 | 4/2010 | Kittelson et al. |
| 7,757,511 B2 | 7/2010 | LeClear et al. |
| 7,794,805 B2 | 9/2010 | Aumaugher et al. |
| 7,845,745 B2 | 12/2010 | Gorz et al. |
| 7,938,148 B2 | 5/2011 | Carlier et al. |
| 7,992,257 B2 | 8/2011 | Kim |
| 8,049,518 B2 | 11/2011 | Wern et al. |
| 8,074,469 B2 | 12/2011 | Hamel et al. |
| 8,079,652 B2 | 12/2011 | Laible et al. |
| 8,108,972 B2 | 2/2012 | Bae et al. |
| 8,157,338 B2 | 4/2012 | Seo et al. |
| 8,162,415 B2 | 4/2012 | Hagele et al. |
| 8,182,051 B2 | 5/2012 | Laible et al. |
| 8,197,019 B2 | 6/2012 | Kim |
| 8,266,923 B2 | 9/2012 | Bauer et al. |
| 8,382,219 B2 | 2/2013 | Hottmann et al. |
| 8,434,317 B2 | 5/2013 | Besore |
| 8,439,460 B2 | 5/2013 | Laible et al. |
| 8,491,070 B2 | 7/2013 | Davis et al. |
| 8,516,845 B2 | 8/2013 | Wuesthoff et al. |
| 8,590,992 B2 | 11/2013 | Lim et al. |
| 8,717,029 B2 | 5/2014 | Chae et al. |
| 8,752,921 B2 | 6/2014 | Gorz et al. |
| 8,763,847 B2 | 7/2014 | Mortarotti |
| 8,764,133 B2 | 7/2014 | Park et al. |
| 8,776,390 B2 | 7/2014 | Hanaoka et al. |
| 8,840,204 B2 | 9/2014 | Bauer et al. |
| 8,881,398 B2 | 11/2014 | Hanley et al. |
| 8,905,503 B2 | 12/2014 | Sahasrabudhe et al. |
| 8,943,770 B2 | 2/2015 | Sanders et al. |
| 8,944,541 B2 | 2/2015 | Allard et al. |
| 9,009,969 B2 | 4/2015 | Choi et al. |
| RE45,501 E | 5/2015 | Maguire |
| 9,056,952 B2 | 6/2015 | Eilbracht et al. |
| 9,074,811 B2 | 7/2015 | Korkmaz |
| 9,080,808 B2 | 7/2015 | Choi et al. |
| 9,102,076 B2 | 8/2015 | Doshi et al. |
| 9,103,482 B2 | 8/2015 | Fujimori et al. |
| 9,125,546 B2 | 9/2015 | Kleemann et al. |
| 9,140,480 B2 | 9/2015 | Kuehl et al. |
| 9,140,481 B2 | 9/2015 | Cur et al. |
| 9,170,045 B2 | 10/2015 | Oh et al. |
| 9,170,046 B2 | 10/2015 | Jung et al. |
| 9,188,382 B2 | 11/2015 | Kim et al. |
| 8,955,352 B2 | 12/2015 | Lee et al. |
| 9,221,210 B2 | 12/2015 | Wu et al. |
| 9,228,386 B2 | 1/2016 | Thielmann et al. |
| 9,267,727 B2 | 2/2016 | Lim et al. |
| 9,303,915 B2 | 4/2016 | Kim et al. |
| 9,328,951 B2 | 5/2016 | Shin et al. |
| 9,353,984 B2 | 5/2016 | Kim et al. |
| 9,410,732 B2 | 8/2016 | Choi et al. |
| 9,423,171 B2 | 8/2016 | Betto et al. |
| 9,429,356 B2 | 8/2016 | Kim et al. |
| 9,448,004 B2 | 9/2016 | Kim et al. |
| 9,463,917 B2 | 10/2016 | Wu et al. |
| 9,482,463 B2 | 11/2016 | Choi et al. |
| 9,506,689 B2 | 11/2016 | Carbajal et al. |
| 9,518,777 B2 | 12/2016 | Lee et al. |
| 9,568,238 B2 | 2/2017 | Kim et al. |
| D781,641 S | 3/2017 | Incukur |
| D781,642 S | 3/2017 | Incukur |
| 9,605,891 B2 | 3/2017 | Lee et al. |
| 9,696,085 B2 | 7/2017 | Seo et al. |

(56) References Cited

U.S. PATENT DOCUMENTS

| | | |
|---|---|---|
| 9,702,621 B2 | 7/2017 | Cho et al. |
| 9,759,479 B2 | 9/2017 | Ramm et al. |
| 9,777,958 B2 | 10/2017 | Choi et al. |
| 9,791,204 B2 | 10/2017 | Kim et al. |
| 9,833,942 B2 | 12/2017 | Wu et al. |
| 2002/0004111 A1 | 1/2002 | Matsubara et al. |
| 2002/0114937 A1 | 8/2002 | Albert et al. |
| 2002/0144482 A1 | 10/2002 | Henson et al. |
| 2003/0056334 A1 | 3/2003 | Finkelstein |
| 2003/0157284 A1 | 8/2003 | Tanimoto et al. |
| 2003/0167789 A1 | 9/2003 | Tanimoto et al. |
| 2003/0173883 A1 | 9/2003 | Koons |
| 2004/0144130 A1 | 7/2004 | Jung |
| 2004/0226141 A1 | 11/2004 | Yates et al. |
| 2005/0042247 A1 | 2/2005 | Gomoll et al. |
| 2005/0229614 A1 | 10/2005 | Ansted |
| 2006/0064846 A1 | 3/2006 | Espendola et al. |
| 2006/0261718 A1 | 11/2006 | Miseki et al. |
| 2006/0266075 A1 | 11/2006 | Itsuki et al. |
| 2007/0266654 A1 | 11/2007 | Noale |
| 2008/0044488 A1 | 2/2008 | Zimmer et al. |
| 2008/0048540 A1 | 2/2008 | Kim |
| 2008/0138458 A1 | 6/2008 | Ozasa et al. |
| 2008/0196441 A1 | 8/2008 | Ferreira |
| 2009/0032541 A1 | 2/2009 | Rogala et al. |
| 2009/0131571 A1 | 5/2009 | Fraser et al. |
| 2009/0205357 A1 | 8/2009 | Lim et al. |
| 2009/0302728 A1 | 12/2009 | Rotter et al. |
| 2009/0322470 A1 | 12/2009 | Yoo et al. |
| 2010/0206464 A1 | 8/2010 | Heo et al. |
| 2010/0218543 A1 | 9/2010 | Duchame |
| 2010/0287843 A1 | 11/2010 | Oh |
| 2010/0287974 A1 | 11/2010 | Cur et al. |
| 2011/0011119 A1 | 1/2011 | Kuehl et al. |
| 2011/0023527 A1 | 2/2011 | Kwon et al. |
| 2011/0095669 A1 | 4/2011 | Moon et al. |
| 2011/0215694 A1 | 9/2011 | Fink et al. |
| 2011/0220662 A1 | 9/2011 | Kim et al. |
| 2011/0309732 A1 | 12/2011 | Horil et al. |
| 2012/0011879 A1 | 1/2012 | Gu |
| 2012/0060544 A1 | 3/2012 | Lee et al. |
| 2012/0099255 A1 | 4/2012 | Lee et al. |
| 2012/0240612 A1 | 9/2012 | Wusthoff et al. |
| 2012/0280608 A1 | 11/2012 | Park et al. |
| 2013/0026900 A1 | 1/2013 | Oh et al. |
| 2013/0043780 A1 | 2/2013 | Ootsuka et al. |
| 2013/0221819 A1 | 8/2013 | Wing |
| 2013/0270732 A1 | 10/2013 | Wu et al. |
| 2013/0285527 A1 | 10/2013 | Choi et al. |
| 2013/0293080 A1 | 11/2013 | Kim et al. |
| 2014/0009055 A1 | 1/2014 | Cho et al. |
| 2014/0097733 A1 | 4/2014 | Seo et al. |
| 2014/0166926 A1 | 6/2014 | Lee et al. |
| 2014/0190978 A1 | 7/2014 | Bowman et al. |
| 2014/0216706 A1 | 8/2014 | Melton et al. |
| 2014/0232250 A1 | 8/2014 | Kim et al. |
| 2014/0346942 A1 | 11/2014 | Kim et al. |
| 2015/0011668 A1 | 1/2015 | Kolb et al. |
| 2015/0015133 A1 | 1/2015 | Carbajal et al. |
| 2015/0017386 A1 | 1/2015 | Kolb et al. |
| 2015/0059399 A1 | 3/2015 | Hwang et al. |
| 2015/0115790 A1 | 4/2015 | Ogg |
| 2015/0159936 A1 | 6/2015 | Oh et al. |
| 2015/0176888 A1 | 6/2015 | Cur et al. |
| 2015/0184923 A1 | 7/2015 | Jeon |
| 2015/0190840 A1 | 7/2015 | Muto et al. |
| 2015/0224685 A1 | 8/2015 | Amstutz |
| 2015/0241115 A1 | 8/2015 | Strauss et al. |
| 2015/0241118 A1 | 8/2015 | Wu |
| 2015/0285551 A1 | 10/2015 | Aiken et al. |
| 2016/0084567 A1 | 3/2016 | Fernandez et al. |
| 2016/0116100 A1 | 4/2016 | Thiery et al. |
| 2016/0123055 A1 | 5/2016 | Jeyama |
| 2016/0161175 A1 | 6/2015 | Benold et al. |
| 2016/0178267 A1 | 6/2016 | Hao et al. |
| 2016/0178269 A1 | 6/2016 | Hiemeyer et al. |
| 2016/0235201 A1 | 8/2016 | Soot |
| 2016/0240839 A1 | 8/2016 | Umeyama et al. |
| 2016/0258671 A1 | 9/2016 | Allard et al. |
| 2016/0290702 A1 | 10/2016 | Sexton et al. |
| 2016/0348957 A1 | 12/2016 | Hitzelberger et al. |
| 2017/0038126 A1 | 2/2017 | Lee et al. |
| 2017/0157809 A1 | 6/2017 | Deka et al. |
| 2017/0176086 A1 | 6/2017 | Kang |
| 2017/0184339 A1 | 6/2017 | Liu et al. |

FOREIGN PATENT DOCUMENTS

| | | |
|---|---|---|
| CN | 102717578 A | 10/2012 |
| CN | 202973713 U | 6/2013 |
| CN | 104816478 A | 8/2015 |
| CN | 105115221 | 12/2015 |
| CN | 204963379 U | 1/2016 |
| DE | 9204365 U1 | 7/1992 |
| DE | 4110292 A1 | 10/1992 |
| DE | 4409091 | 9/1995 |
| DE | 69401889 T2 | 9/1997 |
| DE | 19648305 A1 | 5/1998 |
| DE | 19914105 | 9/2000 |
| DE | 10114633 A1 | 9/2002 |
| DE | 102011051178 A1 | 12/2012 |
| DE | 102014206559 A1 | 10/2015 |
| EP | 0645576 A1 | 3/1995 |
| EP | 1602425 A1 | 12/2005 |
| EP | 1624263 A2 | 8/2006 |
| EP | 2543942 A2 | 1/2013 |
| EP | 2878427 A1 | 6/2015 |
| FR | 2991698 A1 | 12/2013 |
| JP | 860138381 A | 7/1985 |
| JP | 04165197 | 6/1992 |
| JP | 04165197 | 10/1992 |
| JP | 04309778 A | 11/1992 |
| JP | 11159693 A | 6/1999 |
| JP | H11201627 A | 7/1999 |
| JP | 2000320958 A | 11/2000 |
| JP | 2002068853 | 3/2002 |
| JP | 3438948 B2 | 8/2003 |
| JP | 2005069596 A | 3/2005 |
| JP | 2005098637 A | 4/2005 |
| JP | 2006161834 A | 6/2006 |
| JP | 2006200685 A | 8/2006 |
| JP | 2008190815 A | 8/2008 |
| JP | 2009287791 A | 12/2009 |
| JP | 2013050267 A | 3/2013 |
| JP | 2013076471 A | 4/2013 |
| KR | 20050095357 A | 9/2005 |
| KR | 100620025 B1 | 9/2006 |
| KR | 1020070065743 A | 6/2007 |
| KR | 20090026045 | 3/2009 |
| KR | 20150089495 A | 8/2015 |
| RU | 2061925 C1 | 6/1996 |
| RU | 2077411 C1 | 4/1997 |
| RU | 2081858 | 6/1997 |
| RU | 2132522 C2 | 6/1999 |
| RU | 2162576 C2 | 1/2001 |
| RU | 2166158 C1 | 4/2001 |
| RU | 2187433 C2 | 8/2002 |
| RU | 2234645 C1 | 8/2004 |
| RU | 2252377 | 5/2005 |
| RU | 2253792 C2 | 6/2005 |
| RU | 2349618 C2 | 3/2009 |
| RU | 2414288 C2 | 3/2011 |
| RU | 2422598 | 6/2011 |
| RU | 142892 | 7/2014 |
| RU | 2529525 C1 | 9/2014 |
| RU | 2571031 | 12/2015 |
| SU | 203707 | 12/1967 |
| SU | 00476407 A1 | 7/1975 |
| SU | 547614 | 5/1977 |
| SU | 648780 A1 | 2/1979 |
| SU | 01307186 A1 | 4/1987 |
| WO | 9204301 A1 | 3/1992 |
| WO | 9614207 A1 | 5/1996 |
| WO | 9721767 | 6/1997 |

(56) References Cited

FOREIGN PATENT DOCUMENTS

| WO | 9920961 A1 | 4/1999 |
|---|---|---|
| WO | 9920964 | 4/1999 |
| WO | 200160598 | 8/2001 |
| WO | 200202987 | 1/2002 |
| WO | 2002052208 | 4/2002 |
| WO | 02060576 A1 | 8/2002 |
| WO | 03072684 A1 | 9/2003 |
| WO | 2004010042 A1 | 1/2004 |
| WO | 2006045694 | 5/2006 |
| WO | 2006073540 A2 | 7/2006 |
| WO | 2007033836 A1 | 3/2007 |
| WO | 2007106067 A2 | 9/2007 |
| WO | 2008065453 | 6/2008 |
| WO | 2008077741 A2 | 7/2008 |
| WO | 2008118536 A2 | 10/2008 |
| WO | 2008122483 A2 | 10/2008 |
| WO | 2009013106 A2 | 1/2009 |
| WO | 2009112433 A1 | 9/2009 |
| WO | 2010007783 A1 | 1/2010 |
| WO | 2010127947 A2 | 11/2010 |
| WO | 2011058678 A1 | 5/2011 |
| WO | 2012152646 A2 | 11/2012 |
| WO | 2013116103 | 8/2013 |
| WO | 2013116302 | 8/2013 |
| WO | 2014038150 A1 | 3/2014 |
| WO | 2014121893 A1 | 8/2014 |
| WO | 2014184393 A1 | 11/2014 |
| WO | 2013140816 A1 | 8/2015 |
| WO | 2016082907 A1 | 6/2016 |
| WO | 2017029782 A1 | 2/2017 |

OTHER PUBLICATIONS

Raszewski et al., "Methods For Producing Hollow Glass Microspheres," Powerpoint, cached from Google, Jul. 2009, 6 pages.

VACUUM INSULATION STRUCTURES WITH MULTIPLE INSULATORS

CROSS REFERENCE TO RELATED APPLICATIONS

The present application is a Divisional of U.S. patent application Ser. No. 17/037,855, entitled, "VACUUM INSULATION STRUCTURES WITH MULTIPLE INSULATORS," filed Sep. 30, 2020, now U.S. Pat. No. 11,555,643, which is a Continuation of U.S. patent application Ser. No. 15/776,276, entitled "VACUUM INSULATION STRUCTURES WITH MULTIPLE INSULATORS," filed May 15, 2018, now U.S. Pat. No. 10,808,987, which is a national stage entry of PCT/US2016/063966, filed on Nov. 29, 2016, which claims the benefit under 35 U.S.C. § 119(e) to U.S. Provisional Patent Application No. 62/265,055 filed Dec. 9, 2015. The entire disclosures of each are incorporated herein by reference in their entirety.

BACKGROUND

The efficiency of a refrigerator may, at least in part, rely on the refrigerator's ability to keep items within the refrigerator cool and prevent heat from entering the refrigerator. Accordingly, new methods and materials of insulating a refrigerator are sought.

BRIEF SUMMARY OF THE DISCLOSURE

According to one aspect of the present disclosure, a method for manufacturing a vacuum insulated structure includes positioning an inner liner within an external wrapper and defining a gap between the inner liner and the external wrapper, drawing a vacuum to seal the gap, and injecting a first insulator into the gap. The method further includes positioning a filter proximate to the first insulator within the gap and injecting a second insulator into the gap proximate to the filter.

According to another aspect of the present disclosure, a method for manufacturing a cabinet for a refrigerator includes positioning a liner within a wrapper to define a gap and dispensing a first insulator within the gap through a back aperture of the wrapper. The method further includes positioning a filter on the first insulator and dispensing a second insulator within the gap through the back aperture and proximate to the filter.

These and other features, advantages, and objects of the present disclosure will be further understood and appreciated by those skilled in the art by reference to the following specification, claims, and appended drawings.

BRIEF DESCRIPTION OF THE DRAWINGS

The foregoing summary, as well as the following detailed description of the disclosure, will be better understood when read in conjunction with the appended drawings. For the purpose of illustrating the disclosure, there are shown in the drawings, certain embodiment(s). It should be understood, however, that the disclosure is not limited to the precise arrangements and instrumentalities shown. Drawings are not necessarily to scale. Certain features of the disclosure may be exaggerated in scale or shown in schematic form in the interest of clarity and conciseness.

DETAILED DESCRIPTION

As required, detailed embodiments of the present disclosure are disclosed herein. However, it is to be understood that the disclosed embodiments are merely exemplary of the disclosure that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present disclosure.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

It is to be understood that the present disclosure is not limited to the particular embodiments described below, as variations of the particular embodiments may be made and still fall within the scope of the appended claims. It is also to be understood that the terminology employed is for the purpose of describing particular embodiments, and is not intended to be limiting. Instead, the scope of the present disclosure will be established by the appended claims.

Figure 1A:
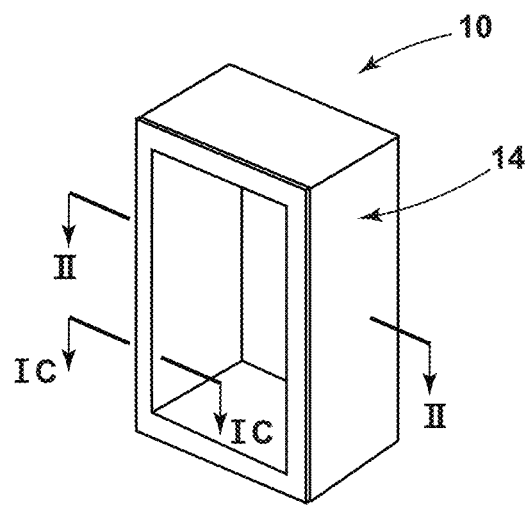
FIG. 1A is a top perspective view of a refrigerator cabinet, according to one embodiment.

For purposes of description herein, the terms "upper," "lower," "right," "left," "rear," "front," "vertical," "horizontal," and derivatives thereof shall relate to the disclosure as oriented in FIG. 1A, unless stated otherwise. However, it is to be understood that the disclosure may assume various alternative orientations, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to FIGS. 1A-4B, a refrigerator 10 includes a cabinet 14 having an inner liner 18 and an external wrapper 22. The inner liner 18 is positioned within the external wrapper 22 such that a gap 26 is defined between the external wrapper 22 and internal liner 18. A first insulator 30 is positioned within the gap 26 and a second insulator 34 is positioned within the gap 26. A pressure within the gap 26 may be below about 1000 Pa.

Figure 1B:
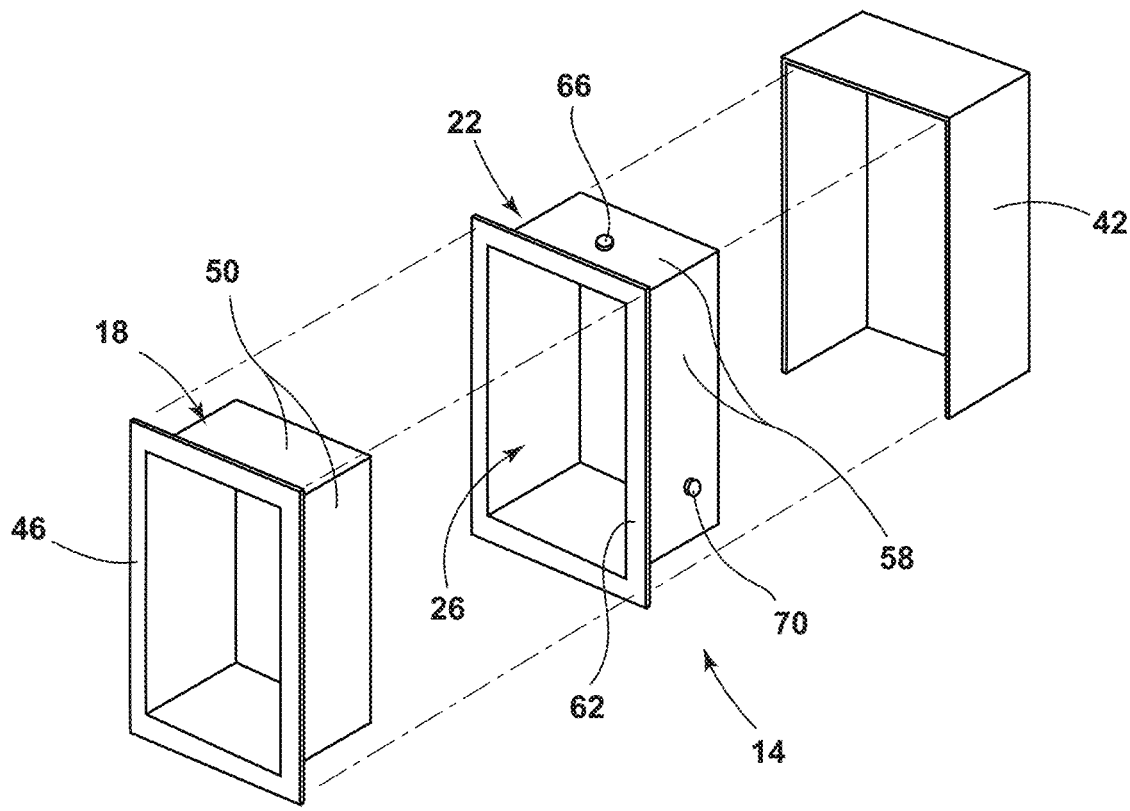
FIG. 1B is an exploded top perspective view of the refrigerator cabinet of FIG. 1A, according to one embodiment.

Referring now to FIGS. 1A and 1B, the refrigerator 10 includes the cabinet 14. The refrigerator 10 may take a variety of configurations including French door, side-by-side, top freezer, bottom freezer, counter depth, compact, built-in, and other types of refrigerators. The cabinet 14 includes the inner liner 18, the external wrapper 22 and may optionally include a shell 42. In the depicted embodiment, the inner liner 18 has a generally rectangular box shape, but may take a variety of shapes including a cube, prism, parallelepiped, etc. and combinations thereof. The inner liner 18 may have a liner flange 46 disposed around the inner liner 18 and connected to a plurality of liner walls 50 which define the inner liner 18. The inner liner 18 may be formed from a polymeric material having high barrier properties (e.g., low gas permeation), metals and combinations thereof. The inner liner 18 may be formed via thermoforming, injection molding, bending and/or forming. The liner walls 50 of the inner liner 18 may have a thickness ranging from between about 0.1 mm to about 3.0 mm. In a specific embodiment, the liner walls 50 have a thickness of about 0.5 mm.

The inner liner 18 is shaped and configured to mate, couple or otherwise be positioned within the external wrapper 22. The external wrapper 22 includes a plurality of wrapper walls 58 to which a wrapper flange 62 is coupled. The wrapper flange 62 and the liner flange 46 are configured to be coupled when the cabinet 14 is in an assembled configuration. The coupling of the liner flange 46 and the wrapper flange 62 may be performed such that an airtight, or hermetic, seal is formed between the inner liner 18 and the external wrapper 22. The hermetic seal of the wrapper flange 62 and the liner flange 46 may be achieved through use of adhesives, welding, an elastomeric gasket under compression and/or crimping. The coupling of the liner flange 46 to the wrapper flange 62 may be performed proximate a front flange area 64 (FIG. 2A) of the cabinet 14. The front flange area 64 may be configured to couple with a door which permits access to an interior of the cabinet 14.

The external wrapper 22 may be formed of and by any of the materials and processes listed above in connection with the inner liner 18. The wrapper walls 58 of the external wrapper 22 may have a thickness ranging from between about 0.1 mm to about 3.0 mm. In a specific embodiment, the wrapper walls 58 have a thickness of about 0.5 mm. The wrapper walls 58 of the external wrapper 22 may define an injection port 66 and/or a vacuum port 70. The external wrapper 22 may include one or multiple injection ports 66 and/or vacuum ports 70. The injection ports 66 and/or vacuum ports 70 may be positioned as illustrated or in a variety of positions about the external wrapper 22. It will be understood that in alternative embodiments, the injection ports 66 and/or vacuum ports 70 may be disposed on both the external wrapper 22 and inner liner 18, or solely on the inner liner 18. The injection port 66 and the vacuum port 70 may be used to access (e.g., to inject an insulator, draw a vacuum and/or perform maintenance within) the gap 26 once the inner liner 18 and the external wrapper 22 are bonded. The injection port 66 and the vacuum port 70 may have a diameter of between about 10 mm and about 50 mm, or between about 12.5 mm and about 25 mm. In various embodiments, the injection port 66 and the vacuum port 70 may have different diameters than one another. Similarly, in embodiments utilizing more than one injection port 66 and vacuum port 70, the sizes of the injection ports 66 and the vacuum ports 70 may vary.

Figure 1C:
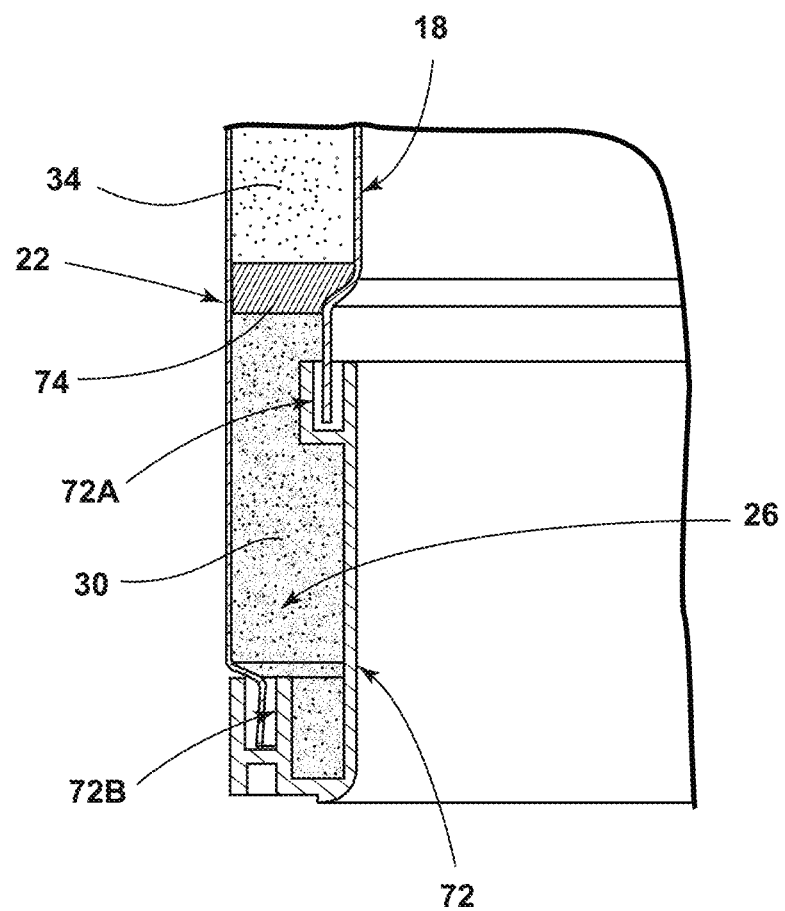
FIG. 1C is a cross-sectional view taken at line IC-1C of FIG. 1A, according to one embodiment.

Referring now to FIG. 1C, the inner liner 18 and the external wrapper 22 may be joined via a trim breaker 72. The trim breaker 72 may be formed of a plastic, a metal, a composite and/or insulating materials. The trim breaker 72 may define a liner joint 72A configured to couple the inner liner 18 to the trim breaker 72. The trim breaker 72 may also define a wrapper joint 72B configured to couple the external wrapper 22 to the trim breaker 72. The liner joint 72A and the wrapper joint 72B may be vibration welded, crimped, thermally bonded, adhesively bonded or otherwise coupled to render the gap 26 airtight. The trim breaker 72 may be used to hold the inner liner 18 and the external wrapper 22 together and in place. Use of the trim breaker 72 may provide advantages of resisting thermal bridging between the inner liner 18 and the external wrapper 22 and easing manufacturing.

Figure 2A:
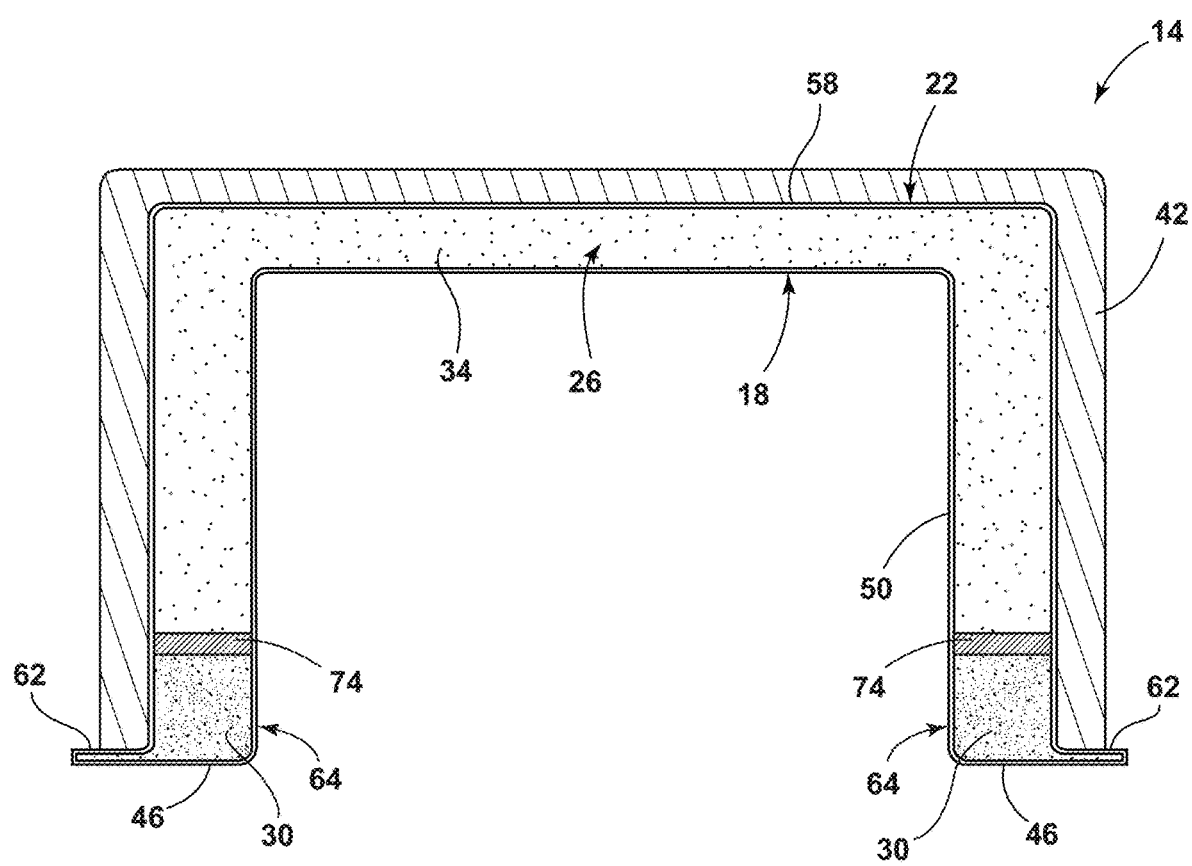
FIG. 2A is a cross-sectional view taken at line II-11 of FIG. 1A, according to one embodiment.

Referring now to FIG. 2A, once the inner liner 18 and the external wrapper 22 have been joined and the gap 26 defined, the first insulator 30 and the second insulator 34 may be dispensed into the gap 26. The gap 26 may have a thickness of between about 12 mm to about 30 mm. The gap 26 may have an air pressure of less than about 1 atm (101,325 Pa, 1013.25 mbar), less than about 0.5 atm (50, 662.5 Pa, 506.63 mbar), less than about 0.1 atm (10,132.5 Pa, 101.33 mbar), less than about 0.001 atm (101.325 Pa, 1.0133 mbar) or less than about 0.00001 atm (1.01 Pa, 0.01 mbar). Over the service life of the refrigerator 10 (FIG. 1A), the air pressure within the gap 26 may rise more than about 0.001 atm (101 Pa, 1.01 mbar), greater than about 0.005 atm (506 Pa, 5.06 mbar) or greater than about 0.01 atm (1,013 Pa, 10.13 mbar) due to diffusion and/or permeation of gases into the gap 26 through the inner liner 18 and/or the external wrapper 22. The first and second insulators 30, 34 may be a material configured to have low thermal conductivity. For example, the first and second insulators 30, 34 may include precipitated silica, polyurethane foam, fumed silica, silica fume, beads (e.g., of glass, ceramic, and/or an insulative polymer), hollow organic micro/nano spheres, hollow inorganic micro/nano spheres, silica aerogel, nano-aerogel powder, rice husk ash, diatomaceous earth, cenospheres, perlite, glass fibers, polyisocyanurate, urea foam, rice hulls, polyethylene foam, vermiculite, fiberglass and combinations thereof. Optionally, an opacifier (e.g., $TiO_2$, SiC and/or carbon black) may be included in the first and/or second insulators 30, 34. Additionally or alternatively, materials configured to change the radiation conduction, flow properties and packing factor of the first and second insulators 30, 34 may be introduced. Further, one or more gas (e.g., oxygen, hydrogen, carbon dioxide) and/or moisture getters may be included in the first and second insulators 30, 34. The first and second insulators 30, 34 may include the same insulating material as one another, may be substantially the same material, or may be completely different materials.

In embodiments where the first and/or second insulators 30, 34 include organic spheres, the organic spheres may include polystyrene, polythiophenes, polyethylene, rubber and/or combinations thereof. In embodiments where the first and/or second insulators 30, 34 include inorganic spheres, the spheres may include glasses, ceramics and combinations thereof. In embodiments where the first and/or second insulators 30, 34 include beads or spheres, the beads or spheres may have an average outer diameter ranging from about 50 nm to about 300 µm, or from about 1 µm to about 300 µm, or from about 50 nm to about 1000 nm. In various embodiments, the diameter size distribution of the spheres is low. Sphere embodiments of the first and/or second insulators 30, 34 may be filled with a single gas (e.g., $H_2$, $O_2$, $N_2$, noble gases, volatile organic compounds, $CO_2$, SO, $SO_2$) or a mixture of gases (e.g., atmosphere, noble gases, $O_2$, $SO_2$, SO). The spheres may be sealed and have a gas pressure within the spheres of between about 0.1 atm and about 1.0 atm, or between about 0.2 atm and about 0.5 atm, or between about 0.25 atm and about 0.35 atm. The first and/or second insulators 30, 34 are positioned within the gap 26 and in contact with both the wrapper walls 58 and the liner walls 50. The packing factor of the first and/or second insulators 30, 34 within the gap 26 may be greater than about 60%, greater than about 62%, greater than about 65%, or greater than about 70%.

In embodiments where the first and/or second insulators 30, 34 include fumed silica, the fumed silica may be hydrophobic and/or hydrophilic. The fumed silica may have a particle size ranging from less than about 0.005μ to greater than about 1.0μ. The fumed silica may have a density of between about 32 kg/m$^3$ to about 80 kg/m$^3$. When positioned within the gap 26, the fumed silica may have a density between about 50 kg/m$^3$ to about 300 kg/m$^3$, or between about 80 kg/m$^3$ to about 250 kg/m$^3$ or between about 150 kg/m$^3$ to about 200 kg/m$^3$.

The first and second insulators 30, 34 are configured not only to thermally insulate the inner liner 18 from the external wrapper 22, but also to resist the inward directed force of the atmosphere on the lower than atmosphere pressure of the gap 26. Atmospheric pressure on the inner liner 18 and the external wrapper 22 may cause distortions which are unsightly and may lead to a rupture in either of the inner liner 18 or the external wrapper 22 thereby causing a loss of vacuum in the gap 26. Further, drawing the vacuum in the gap 26 may cause an impact or shock loading of the first and second insulators 30, 34 as the inner liner 18 and the external wrapper 22 contract around the first and second insulators 30, 34. Accordingly, the first and second insulators 30, 34 should have sufficient crush resistance to resist deformation of the inner liner 18 and the external wrapper 22 due to a pressure gradient between the atmosphere and an air pressure of the gap 26.

The first insulator 30 may be positioned within, and proximate to, the front flange area 64 of the cabinet 14 and the second insulator 34 may fill the rest of the gap 26. In the depicted embodiment, a filter 74 is positioned between the first insulator 30 and the second insulator 34. The filter 74 may be made of paper, a polymeric material, a ceramic and/or a metal. The filter 74 may be porous, solid and/or coupled to the inner liner 18 and/or the external wrapper 22. Use of the filter 74 may resist or prevent the migration and mixing of the first and second insulators 30, 34 such that the first and second insulators 30, 34 remain segregated. The front flange area 64, due to its thinner cross section and being surrounded by atmosphere on three sides, may suffer from a thermal, or heat, bridging effect. Such a thermal bridging across the front flange area 64 may result in an overall reduced efficiency of the refrigerator 10. Accordingly, in various embodiments the first insulator 30 may have a higher insulating property than the second insulator 34. In such an embodiment, the higher insulating property of the first insulator 30 may be sufficient to reduce, or eliminate any thermal bridging taking place through the front flange area 64.

Figure 2B:
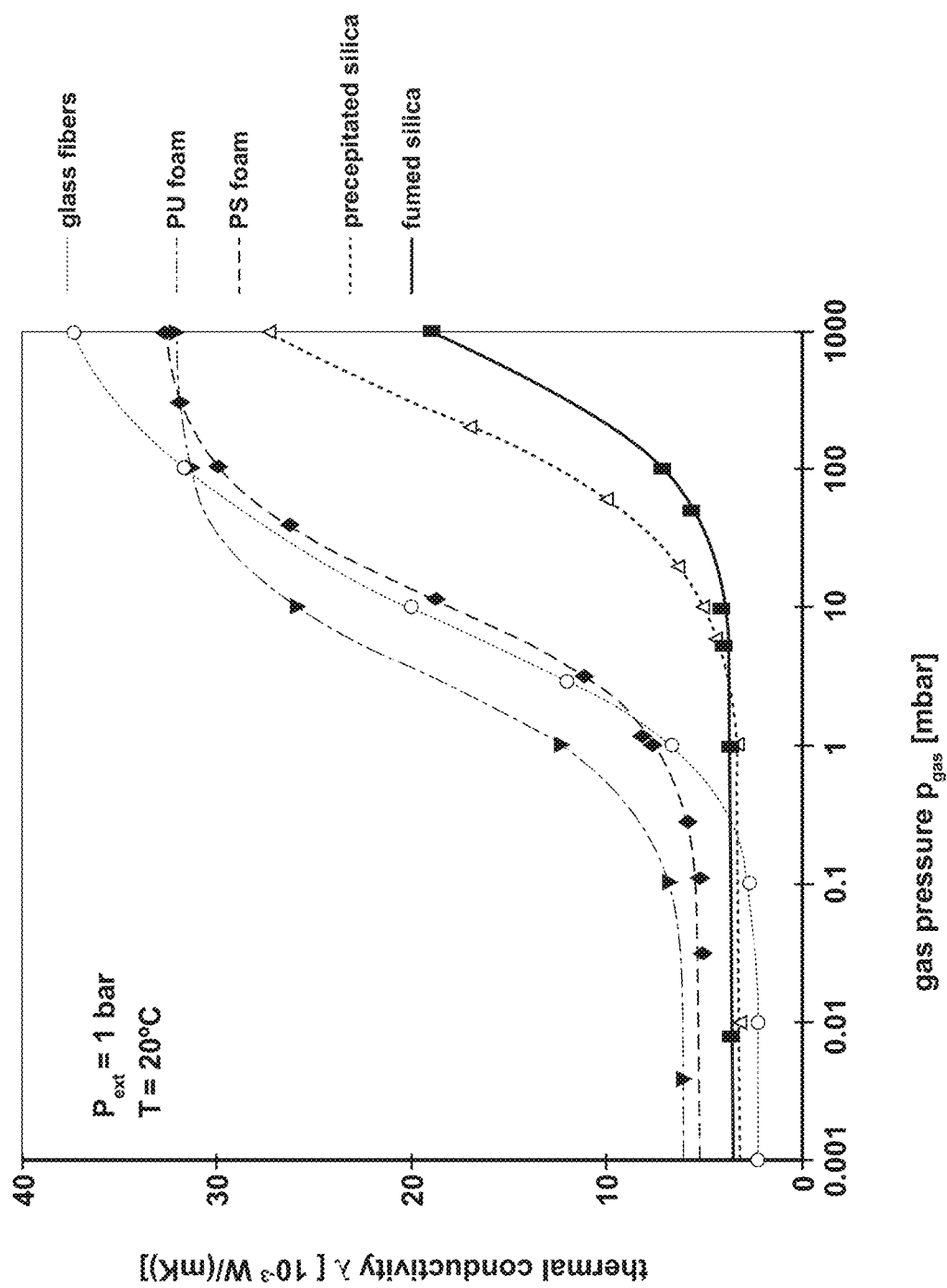
FIG. 2B is a graph depicting the thermal conductivity of various insulator materials as a function of gas pressure.

Referring now to FIGS. 2A and 2B, as explained above, the gap 26 within the cabinet 14 may undergo a pressure increase over the service life of the refrigerator 10 due to permeation and/or diffusion of gases. As such, selection of the first and second insulators 30, 34 may account for the expected change in pressure within the gap 26. As can be seen in FIG. 2B, fumed silica undergoes the smallest increase in thermal conductivity over an expected pressure change range (e.g., between about 1 mbar and about 10 mbar), followed by precipitated silica. As such, use of fumed silica as the first insulator 30 and precipitated silica and/or combinations of insulators (e.g., precipitated silica and spheres) as the second insulator 34 may not only reduce thermal bridging across the front flange area 64 while the gap 26 is at manufactured pressure, but also over the service life of the refrigerator 10.

Figure 3A:
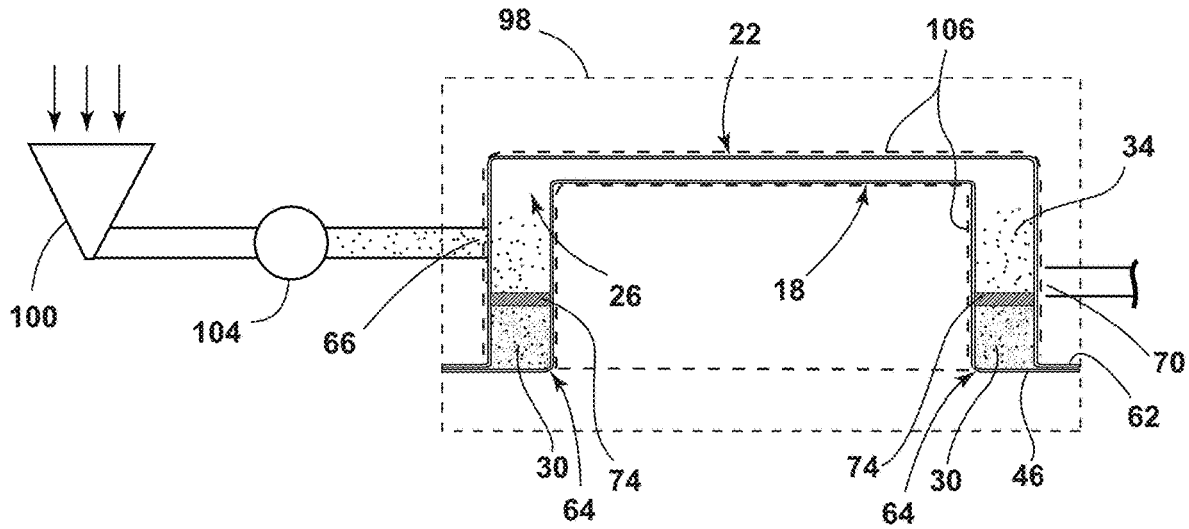
FIG. 3A is a schematic depiction of a refrigerator cabinet insulator filling system, according to one embodiment.
Figure 3B:
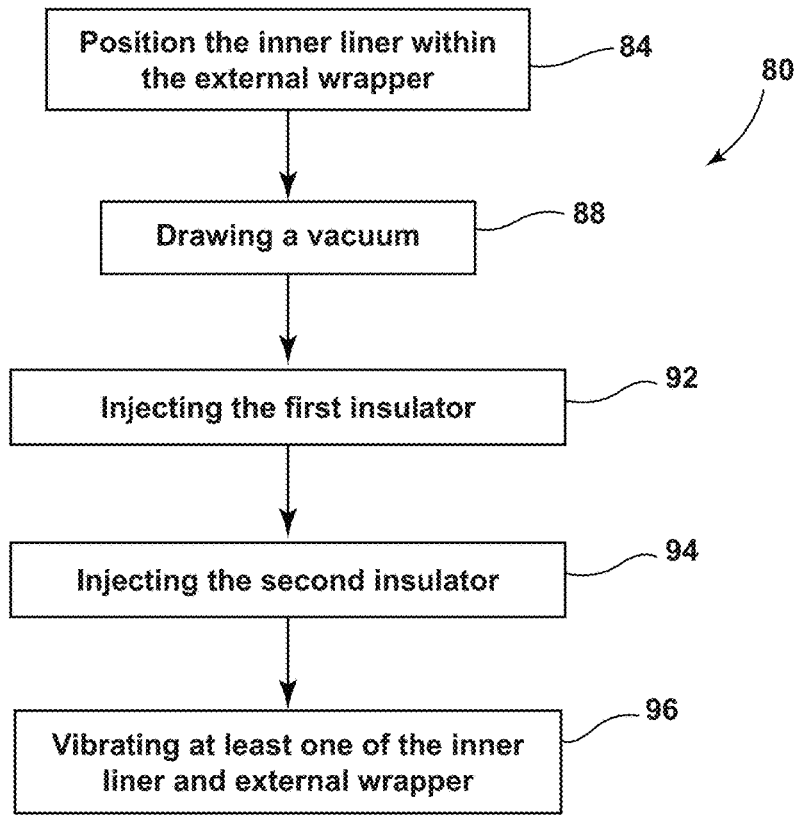
FIG. 3B is a flow chart of a refrigerator cabinet insulator filling method, according to one embodiment.

Referring now to FIGS. 3A and 3B, one embodiment of a first method 80 of inserting the first and second insulators 30, 34 within the gap 26 is depicted. The first method 80 includes step 84, step 88, step 92, step 94 and step 96. In step 84, the inner liner 18 is positioned within the external wrapper 22 as explained in greater detail above. The liner flange 46 and the wrapper flange 62 may be bonded so as to make the gap 26 airtight. Next, step 88 of drawing a vacuum may be performed. A vacuum, or negative pressure relative to atmospheric pressure, is generated within the gap 26. The vacuum is created by drawing the air out of the gap 26 through the at least one vacuum port 70. A pump or other suitable vacuum sources may be connected to the vacuum port 70 to facilitate drawing the vacuum. Additionally or alternatively, the first method 80, or any of its steps, may be performed within a vacuum chamber 98 to provide the vacuum to the gap 26.

Next, step 92 of injecting the first insulator 30 into the gap 26 is performed. Injection of the first insulator 30 into the gap 26 may be accomplished by feeding the first insulator 30 into a hopper 100 which in turn supplies the first insulator 30 to a transfer mechanism 104. The transfer mechanism 104 may be a powder pump, a vacuum transfer device, pneumatic pump, flexible screw conveyor, auger feeder and/or other devices capable of transferring or moving the first and second insulators 30, 34. The transfer mechanism 104 pumps or otherwise injects the first insulator 30 into the gap 26 of the cabinet 14 (FIG. 1A). The transfer mechanism 104 may utilize fluidization of the first insulator 30 to move the first insulator 30 into the gap 26. The transfer mechanism 104 may dispense the first insulator 30 into the cabinet 14 with or without pressure. Use of the transfer mechanism 104 allows the first insulator 30 to be inserted into the gap 26 without any densification or compaction, while also providing an easy and efficient means of inserting the first insulator 30. Once the first insulator 30 has sufficiently filled the front flange area 64 of the cabinet 14 and optionally been leveled off, the filter 74 may be placed on top of the first insulator 30 and optionally coupled to the inner liner 18 and external wrapper 22. Next, step 94 of injecting the second insulator 34 is performed. Injection of the second insulator 34 may be performed in substantially the same manner as injection of the first insulator 30 is carried out in step 92. In other embodiments, the second insulator 34 may be dispensed or injected under different conditions that produce a different packing factor or density of the second insulator 34 relative to the first insulator 30.

Next, step 96 of vibrating at least one of the inner liner 18 and the external wrapper 22 is performed. Vibration of the inner liner 18 and/or the external wrapper 22 may cause the first insulator 30 to increase its packing factor. During steps 84, 88, 92, 94 and/or 96 the inner liner 18 and/or external wrapper 22 may be supported by one or more supports 106 such that relative motion between the inner liner 18 and the external wrapper 22 is minimized or prevented. The supports 106 may allow the thickness of the gap 26 to remain constant through filling and vibration. It will be understood that although method 80 was described in a specific order, the steps may be performed in any order or simultaneously without departing from the spirit of this disclosure.

Figure 4A:
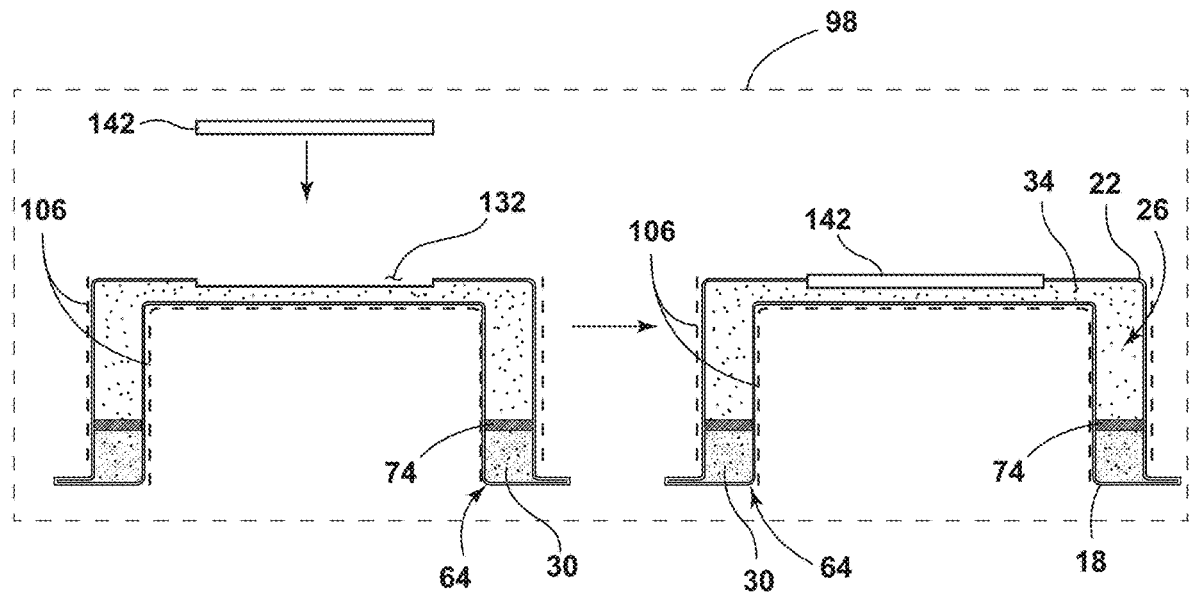
FIG. 4A is a schematic depiction of a refrigerator cabinet insulator filling system, according to one embodiment.
Figure 4B:
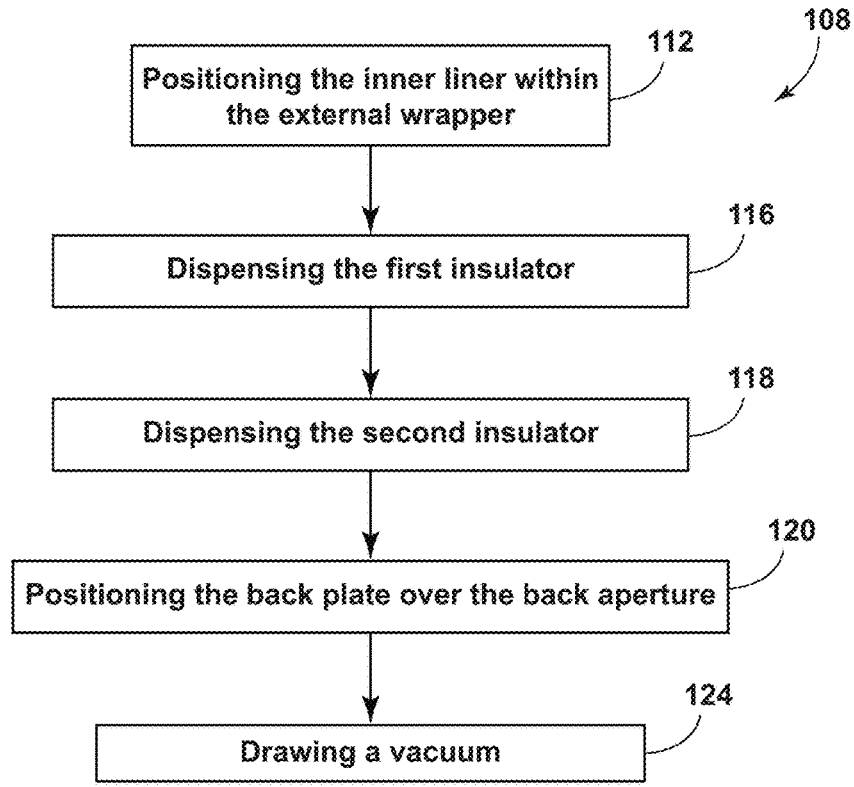
FIG. 4B is a flow chart of a refrigerator cabinet insulator filling method, according to one embodiment.

Referring now to FIGS. 4A and 4B, depicted is a second method 108 of dispensing the insulator 30 within the gap 26 between the inner liner 18 and the external wrapper 22. The second method 108 includes step 112, step 116, step 118, step 120 and step 124. The second method 108 begins with step 112 of positioning the inner liner 18 within the external wrapper 22 and sealing the gap 26, as disclosed above. Next step 116 of dispensing the first insulator 30 within the gap 26 is performed. In the second method 108, dispensing of the first insulator 30 into the gap 26 may be accomplished through a back aperture 132. The back aperture 132 may take a variety of shapes (e.g., square, rectangular, circular, oblong, and combinations thereof) and sizes which are configured to allow the first insulator 30 to be poured or otherwise dispensed into the gap 26. The first insulator 30 may be dispensed into the gap 26 between the inner liner 18 and the external wrapper 22 via the transfer mechanism 104 (FIG. 3A), pouring the first insulator 30, or manual application. In embodiments of the cabinet 14 (FIG. 1A) where the external wrapper 22 includes the back aperture 132, the external wrapper 22 may not include the injection port 66 (FIG. 3A). Optionally, step 116 may be performed while at least one of the inner liner 18 and the external wrapper 22 are vibrated. Vibration of the inner liner 18 and/or the external wrapper 22 may facilitate in shaking or vibrating the first insulator 30 into its maximum packing factor and facilitate a more complete filling of the gap 26. Optionally, once the front flange area 64 is sufficiently filled with the first insulator 30 and optionally the first insulator 30 has been leveled off, the filter 74 may be placed on the first insulator 30 as described above.

Once the front flange area 64 of the gap 26 between the inner liner 18 and the external wrapper 22 is filled with the insulator 30 and sufficiently packed with the first insulator 30, step 118 of dispensing the second insulator 34 is performed. Dispensing of the second insulator 34 may be accomplished in a substantially similar manner to that described in connection with the first insulator 30 in step 116. Next, step 120 of positioning a back plate 142 over the back aperture 132 is performed. The back plate 142 may be constructed of the same or similar material as the external wrapper 22, or a different material. Once the back plate 142 is positioned over the back aperture 132, the back plate 142 is sealed to the external wrapper 22 to form an airtight, or hermetic, seal. After step 120 is completed, step 124 of drawing a vacuum within the gap 26 is performed. The vacuum may be drawn through the vacuum port 70 (FIG. 3A) of the external wrapper 22. Additionally or alternatively, method 108, or individual steps thereof, may be performed within the vacuum chamber 98 such that drawing a vacuum may not be necessary, or less vacuum can be drawn. Further, the second method 108 may utilize the supports 106 to resist relative motion of the inner liner 18 and the external wrapper 22. It will be understood that steps of the first and second methods 80, 108 may be omitted, combined, mixed and matched, or otherwise reordered without departing from the spirit of this disclosure.

Use of the present disclosure may offer several advantages. For example, use of the present disclosure allows for the formation of vacuum insulated cabinets 14, panels, and structures without noticeable deformation of the inner liner 18 and the external wrapper 22. By filling the gap 26, deformation of the inner liner 18 and the external wrapper 22 from the pressure differential between the atmosphere and the gap 26 is resisted by the first and second insulators 30, 34. Vacuum insulated cabinets 14, panels and structures may provide enhanced insulative properties as compared to traditional foam filled insulating structures in addition to a reduced size (e.g., thickness decrease of greater than about 55%, 60% or 70%). Additionally, use of the disclosure may allow for the construction of a less dense cabinet 14 while also providing increased rigidity due to the use of the first and second insulators 30, 34. Further strategic use of the first insulator 30 in more critical insulation areas (e.g., in the front flange area 64, in corners and/or thin locations) and the second insulator 34 in the rest of the cabinet 14 may allow for a cost savings in embodiments where the first insulator 30 is more expensive (e.g., fumed silica) than the second insulator 34 (e.g., precipitated silica). Even further, in embodiments where the first insulator 30 has a lower increase in thermal conductivity per unit pressure increase than the second insulator 34, use of the first insulator 30 proximate the front flange area 64 allows for a greater resistance to thermal bridging as the pressure within the gap 26 increases over the service life of the refrigerator 10. It will be understood that although the disclosure was described in terms of a refrigerator, the disclosure may equally be applied to coolers, ovens, dishwashers, laundry applications, water heaters, household insulation systems, ductwork, piping insulation, acoustical insulation and other thermal and acoustical insulation applications.

In this specification and the appended claims, the singular forms "a," "an" and "the" include plural reference unless the context clearly dictates otherwise. For the purposes of describing and defining the present teachings, it is noted that the terms "substantially" and "approximately" are utilized herein to represent the inherent degree of uncertainty that may be attributed to any quantitative comparison, value, measurement, or other representation. The terms "substantially" and "approximately" are also utilized herein to represent the degree by which a quantitative representation may vary from a stated reference without resulting in a change in the basic function of the subject matter at issue.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A method for manufacturing a vacuum insulated structure, comprising:
   positioning an inner liner within an external wrapper and defining a gap between the inner liner and the external wrapper;
   drawing a vacuum to seal the gap;
   injecting a first insulator into the gap;
   positioning a filter proximate to the first insulator within the gap; and
   injecting a second insulator into the gap proximate to the filter.

2. The method of claim 1, further comprising the step of:
   vibrating at least one of the inner liner and the external wrapper.

3. The method of claim 2, further comprising the step of:
   using supports to maintain a thickness of the gap during the vibration of at least one of the inner liner and the external wrapper.

4. The method of claim 1, wherein the step of positioning a filter proximate to the first insulator further comprises the step of:

coupling the filter to the inner liner and the external wrapper.

5. The method of claim 1, wherein the step of injecting a first insulator into the gap further comprises the step of:
dispensing the first insulator into the gap via a transfer mechanism.

6. The method of claim 5, further comprising the step of:
utilizing fluidization of the first insulator to dispense to the first insulator with the transfer mechanism.

7. The method of claim 1, further comprising the step of:
leveling the first insulator within the gap.

8. The method of claim 1, wherein the step of injecting a first insulator further comprises the step of:
injecting the first insulator proximate to a front flange area defined by the inner liner and the external wrapper.

9. A method for manufacturing a cabinet for a refrigerator, comprising:
positioning a liner within a wrapper to define a gap;
dispensing a first insulator within the gap through a back aperture of the wrapper;
positioning a filter on the first insulator; and
dispensing a second insulator within the gap through the back aperture and proximate to the filter.

10. The method of claim 9, further comprising the step of:
bracing the liner and the wrapper with supports.

11. The method of claim 9, further comprising the steps of:
vibrating the liner and the wrapper; and
leveling the first insulator within the gap.

12. The method of claim 9, further comprising the step of:
positioning the liner and the wrapper within a vacuum chamber to define a vacuum in the gap.

13. The method of claim 9, further comprising the step of:
coupling a back plate to the wrapper to define a hermetic seal.

14. The method of claim 13, further comprising the step of:
drawing a vacuum via a vacuum port defined by the wrapper.

15. The method of claim 9, wherein the step of dispensing the first insulator further comprises the step of:
dispensing the first insulator proximate to a front flange area defined by the wrapper and the liner.

* * * * *